Sept. 8, 1959  V. COTMAN, JR  2,903,017
PIPE SUPPORT
Filed Feb. 12, 1958

INVENTOR.
VAL COTMAN, JR.
BY
ATTORNEY

2,903,017
PIPE SUPPORT

Val Cotman, Jr., North Olmsted, Ohio, assignor to The R-W Mfg. Co., Barberton, Ohio, a corporation of Ohio Application February 12, 1958, Serial No. 714,869

5 Claims. (Cl. 138—65)

This invention relates to conduit constructions and more particularly to a construction wherein a conduit carrying a hot or cold fluid is to be supported in axial alignment and in spaced relation to the inner walls of an outer casing.

The invention further relates to a conduit system composed of a plurality of units which may be prefabricated at the factory and then assembled together at the site of the installation, such as in central underground or overhead heating systems, or other systems where fluids subject to temperature variations are to be transported.

Another object of the invention is to construct a pipe support for use in conduit constructions of the above mentioned type which is strong, simple of construction and which may be manufactured at low cost.

Another object of the invention is a pipe support which will satisfactorily carry pipe loads and which is so constructed as to possess a high safety factor.

Another object of the invention is to construct a pipe support which is particularly adapted for use with prefabricated conduit units which may be assembled at the factory and shipped assembled as a unit to the site of installation to become a part of a conduit system.

A still further object is a pipe support of cast material, such as concrete, having a center or axial opening therein to receive a pipe to be supported in a casing and having an outer corrugated band anchored in the cast material, the corrugations being adapted to have supporting contact at the peaks of the corrugations with the inner surface of the outer casing within which the pipe is supported.

Another object of the invention is to provide for drainage of condensation which may form within the outer casing and to permit the same to flow past the pipe supports through the spaces formed between the adjacent corrugations of each support.

Other objects and advantages of this invention will become more apparent as the following description of an embodiment thereof progresses, reference being made to the accompanying drawing in which like reference characters are employed to designate like parts throughout the same.

Figure 1:
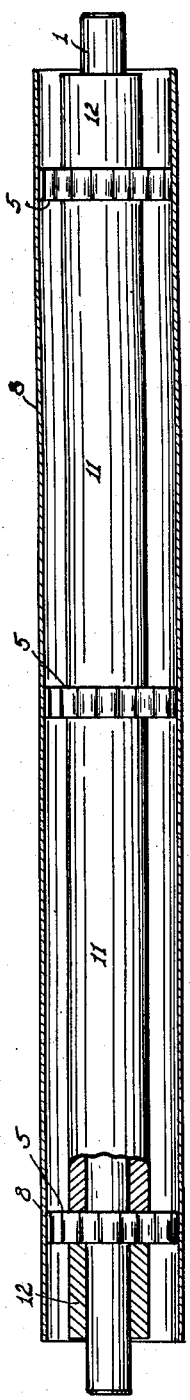
Figure 1 is a longitudinal vertical section through the outer casing of a preassembled or prefabricated conduit unit showing my invention applied in use.
Figure 2:
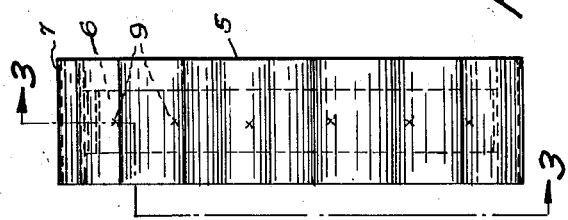
Figure 2 is a side view of one of the supports embodying my invention.
Figure 3:
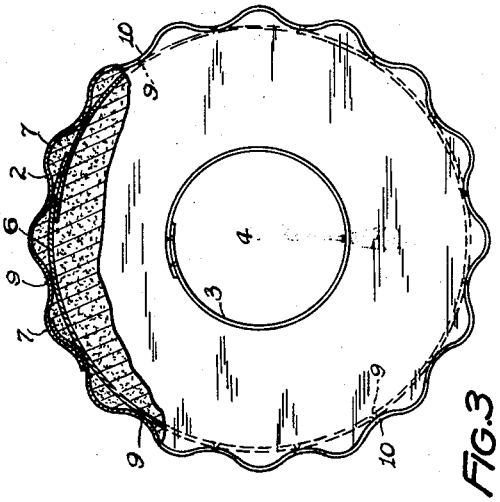
Figure 3 is a part section and front elevation of one of the supports as viewed along line 3—3 of Figure 2.

In carrying out my invention as illustrated in a practical embodiment thereof shown in Figure 1 of the drawing, a multiplicity of the pipe supports may be employed in each outer casing unit to support the conduit 1 at spaced intervals throughout the unit so that the conduit will be spaced from the casing wall throughout its length. Preferably the axes of the conduit and casing are in substantial alignment, as shown.

Each of the supports embodying my invention includes a body of precast material, such as concrete 2, a central sleeve 3 defining a pipe or conduit receiving bore 4 and an outer load supporting band 5 anchored in the concrete by means of an anchoring and reinforcing ring 6.

More specifically, the band 5 preferably is corrugated throughout its extent, the outer extremity or peak 7 of each corrugation having supporting contact with the inner wall of the casing 8. The anchor and reinforcing ring 6 lies within the band 5 and is welded at 9 to the inner corrugations 10, thus imparting great strength and rigidity to the band 5.

In constructing the supports, the concrete is poured into place between the sleeve 3 and the band 5 to fill all the space therebetween including the spaces between the ring 6 and the corrugations of the band 5. The concrete is allowed to set and harden whereupon the sleeve 3 and the ring 6, together with the band 5, will be securely anchored in place.

The ring 6 being welded to the band 5 at spaced intervals, as at 9, affords a succession of reinforced supporting areas around the band and the pipe 1, thus insuring a high safety factor in conveying pipe loads.

I have shown at 11 sleeves of suitable insulation, usually preformed and slipped axially over the pipe 1 alternately with the respective pipe supports so that in the completed prefabricated unit the insulation sleeves will abut the facing walls of adjacent pipe supports. The end insulation sleeves 12 of shorter length are provided to extend the insulation coverage to the ends of the casing 8.

It will be understood from the foregoing description and the drawing that I have produced a very satisfactory pipe support of simple and economic construction and which is possessed of great strength and will effectively protect the fluid carrying pipe in the casing against heavy loads such as are encountered by the casing buried in underground installations.

Various changes may be made in the details of construction and arrangement of parts of the invention without departing from the spirit thereof or the scope of the appended claims.

I claim:

1. In a conduit construction comprising an outer casing, a thermally insulated conduit within the casing and means for supporting the conduit in spaced relation within the casing, said supporting means consisting of a plurality of members disposed in longitudinally spaced relation transversely within the casing, said members each having an opening through which the conduit extends, said members having a corrugated outer perimeter, the outer extremities of the corrugations having load sustaining supporting contact with the inner wall of the outer casing, and a reinforcing ring within the conduit supporting members and secured to the inner extremities of the corrugations, said members having portions overlying the peripheral edges of the ring in the respective members.

2. In a conduit construction comprising an outer casing, a thermally insulated conduit within the casing and means for supporting the conduit in spaced relation within the casing, said supporting means consisting of a rigid annular body having an opening through which the conduit extends, and a peripheral outer band on the body having portions extending radially outwardly for supporting engagement with the inner wall of the casing, said band also having spaced apart portions extending inwardly into said body, said body being formed of a molded in place material, and a reinforcing ring within the band and securely fastened to the inwardly extending portions of the band, said ring being embedded in the molded body material.

3. A pipe support adapted to support a pipe within an outer casing in spaced relation thereto comprising an annular body of molded material having a pipe receiving opening therethrough, an outer supporting peripheral band for load supporting engagement with an outer casing in which the support is installed, said band including a corrugated band, and a reinforcing ring secured at spaced intervals to the inner corrugations of the band and embedded in the molded material of the body.

4. A pipe support adapted to support a pipe within an outer casing in spaced relation thereto comprising an annular body of molded material having a pipe receiving opening therethrough, an outer supporting peripheral band for load supporting engagement with an outer casing in which the support is installed, said band including a corrugated band, and a reinforcing ring secured at spaced intervals to the inner corrugations of the band and embedded in the molded material of the body, the width of said band being greater than that of the ring.

5. In a conduit construction comprising an outer casing, a thermally insulated conduit within the casing and means for supporting the conduit in spaced relation within the casing, said supporting means consisting of a rigid annular body having an opening through which the conduit extends, and a peripheral outer band on the body having portions extending radially outwardly for supporting engagement with the inner wall of the casing, said band also having spaced apart portions extending inwardly into said body, said body being formed of a molded in place material, and a reinforcing ring within the band and securely fastened to the inwardly extending portions of the band, said ring being embedded in the molded body material, said molded material filling the spaces between the adjacent inwardly extending portions of the band and the ring.

References Cited in the file of this patent

UNITED STATES PATENTS

| | | |
|---|---|---|
| 1,930,285 | Robinson | Oct. 10, 1933 |
| 2,532,587 | Williamson | Dec. 5, 1950 |
| 2,658,527 | Kaisar | Nov. 10, 1953 |
| 2,756,032 | Dowell | July 24, 1956 |